United States Patent [19]

Connolly et al.

[11] Patent Number: 5,558,311
[45] Date of Patent: Sep. 24, 1996

[54] SOLENOID VALVE HARNESS

[75] Inventors: John R. Connolly, Rock Falls; Terry L. Forbes, Dixon, both of Ill.

[73] Assignee: Borg-Warner Automotive, Inc., Sterling Heights, Mich.

[21] Appl. No.: 352,279

[22] Filed: Dec. 8, 1994

[51] Int. Cl.⁶ ..................................................... F16K 31/06
[52] U.S. Cl. ................................. 251/129.15; 251/129.21
[58] Field of Search .......................... 251/129.15, 129.21

[56] References Cited

U.S. PATENT DOCUMENTS

| | | | |
|---|---|---|---|
| 4,720,078 | 1/1988 | Nakamural et al. | 251/129.21 |
| 5,275,478 | 1/1994 | Schmitt et al. | 251/129.15 |
| 5,322,260 | 6/1994 | Forbes et al. | 251/129.14 |

*Primary Examiner*—John C. Fox
*Attorney, Agent, or Firm*—Willian Brinks Hofer et al.; Greg Dziegielewski

[57] ABSTRACT

An improved solenoid valve harness assembly for a vehicle transmission is disclosed that is more reliable, less costly to manufacture, and easier to test. In one embodiment, the solenoid valve assembly includes a plurality of solenoid valves and a harness. The harness includes a plurality of conductors for electrically connecting the plurality of solenoid valves to a controller. The harness is connected to the solenoid valves by a plug and receptacle arrangement that reduces the cost of manufacture and that allows each component to be separately tested prior to being plugged together. In one embodiment, the plug and receptacle arrangement permits the solenoid valves to be disconnected from the harness so that a defective component can be replaced without discarding the entire solenoid valve harness. In a further aspect, a solenoid valve harness is provided in which the solenoid valves are internally grounded thereby eliminating the need for ground wires from the solenoid valves.

11 Claims, 7 Drawing Sheets

SOLENOID VALVE HARNESS

BACKGROUND OF THE INVENTION

The present invention relates to solenoid valve harnesses for use in hydraulic transmissions of vehicles.

Hydraulic transmissions of vehicles, such as automobiles or trucks, include a transmission valve body which is located inside the transmission case. The transmission valve body houses spool valves which direct oil flow for operating clutches of the transmission and for pressure regulation. The spool valves located inside the transmission valve body are operated by smaller solenoid valves that are mounted on the transmission valve body. These solenoid valves are operated by a microprocessor controller that is located outside the transmission case. The microprocessor controller provides signals to the solenoid valves which in turn operate the larger spool valves inside the transmission valve body which in turn operate the clutches and the pressure regulator. Alternatively, the solenoid valves may operate the clutches directly.

In one conventional arrangement of a vehicle transmission, there are four solenoid valves. These solenoid valves may be similar or identical to the solenoid valves described in U.S. Pat. No. 5,322,260. These solenoid valves are located inside the vehicle transmission case and are mounted on the transmission valve body. A wiring harness connects to each of these solenoid valves in order to convey electrical signals from the vehicle microprocessor controller which is located outside the transmission case.

In the solenoid valve, the magnet wire used for the solenoid coil is relatively small and fragile compared to the wires used for the harness. In typical prior solenoid valve harnesses, the solenoid valve coil wires are connected to the wires of the harness by soldering or welding. Due to the small size of the coil wires and coil region, this process can be relatively labor intensive, and therefore costly. In addition, the solenoid valve wiring harness is subject to stresses, such as tensile and torsional, during later stages of manufacture and during operation. Because of the difference in size between the solenoid coil wires and the wires of the harness, the connection between the harness and the solenoid valves is susceptible to damage. If just one of the solenoid valve coil wire connections is faulty, the entire solenoid valve harness assembly is defective and will have to be discarded.

Accordingly, it is an object to provide a solenoid valve harness that is easier to manufacture and which is more reliable.

SUMMARY OF THE INVENTION

To address the above concerns, the present invention provides an improved solenoid valve wiring harness assembly for a vehicle transmission. The improved solenoid valve wiring harness is more reliable, less costly to manufacture, and easier to test. In one aspect, the solenoid valve wiring harness assembly includes a plurality of solenoid valves and a harness. The harness includes a plurality of conductors for electrically connecting the plurality of solenoid valves to a controller. The harness is connected to the solenoid valves by a plug and receptacle arrangement that simplifies manufacture and that allows each component to be tested separately prior to being plugged together. According to further aspect of this embodiment of the solenoid valve wiring harness, the plug and receptacle arrangement permits the solenoid valves to be disconnected from the harness so that a defective component can be replaced without discarding the entire solenoid valve wiring harness.

According to a yet further aspect of the invention, a solenoid valve wiring harness is provided in which the solenoid valves are internally grounded thereby eliminating the need for ground wires from the solenoid valves.

DESCRIPTION OF THE PREFERRED EMBODIMENTS

Figure 1:
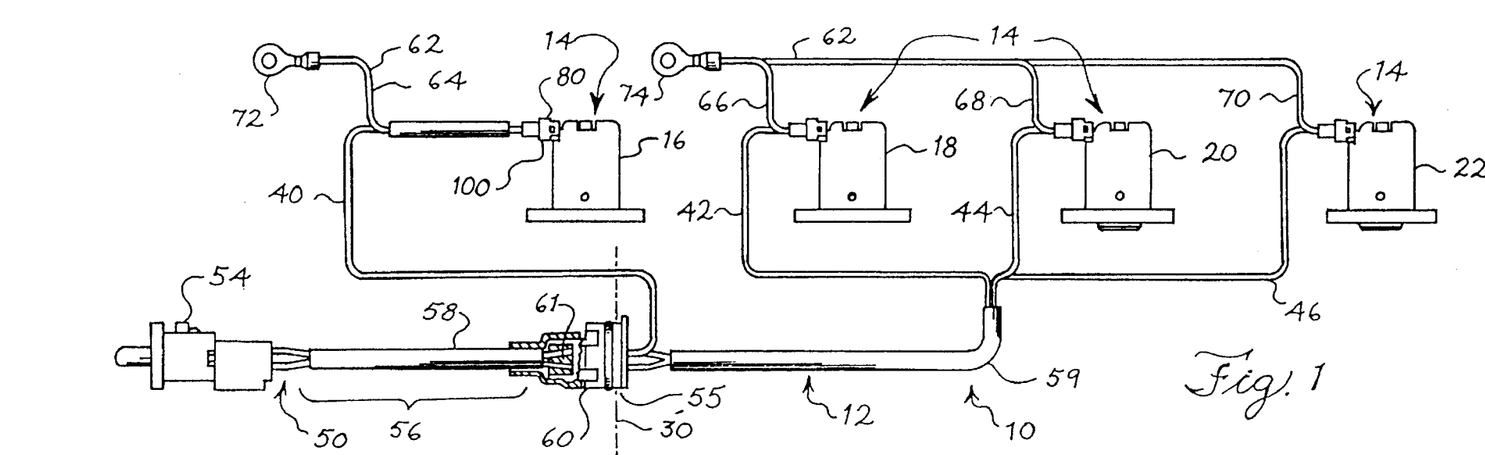
FIG. 1 shows a solenoid valve harness assembly according to a first embodiment of the present invention.

Referring to FIG. 1 there is shown a first preferred embodiment of the present invention. The embodiment shown in FIG. 1 is a solenoid harness assembly 10. The solenoid harness assembly 10 includes a harness portion 12 and a solenoid valve portion 14. The solenoid valve portion is comprised of a plurality of solenoid valves. In the embodiment of FIG. 1, there are four solenoid valves 16, 18, 20 and 22. The solenoid valve harness assembly 10 is used in conjunction with a transmission of a vehicle such as an automobile or truck. The plurality of solenoid valves 14 are mounted on a transmission valve body (not shown) which is part of the vehicle transmission. The transmission valve body is located inside the transmission housing or case (represented by dotted line 30). The solenoid valves 14 interact with other components such as spool valves which are located inside the transmission valve body. The plurality of solenoid valves 14 are connected via the harness 12 to a vehicle controller (not shown) which is located outside the transmission case. The controller sends electrical signals via the harness 12 to each of the solenoid valves 14 to effect operation of the spool valves inside the transmission valve body. In the embodiment shown in FIG. 1, the solenoid valves 16 and 18 are pulse width modulated solenoid valves and the solenoid valves 20 and 22 are on/off solenoid valves. Other than the wire color, the solenoid valves 16 and 18 may be identical to each other and the solenoid valves 20 and 22 may be identical to each other. In a typical mounting arrangement, the solenoid valves 18, 20, and 22 are mounted adjacent to each other on the transmission valve body and the solenoid valve 16 is also mounted on the transmission valve body but is located several inches away from the solenoid valves 18, 20, and 22. Details of these solenoid valves are set forth in U.S. Pat. No. 5,322,260, the entire disclosure of which is incorporated herein by reference.

The harness 12 includes a plurality of lead wires 40, 42, 44, and 46. In a present embodiment, each of these lead wires includes a separate metallic conductor surrounded by a non-conductive plastic jacket. In the embodiment of FIG. 1, the harness 12 has four separate lead wires or conductors, one for each of the solenoid valves 14. At one end 50 of the harness 12, the lead wires terminate in a controller plug 54 that is sized and adapted for connection to the vehicle controller (not shown). In this manner, signals from the controller can be sent to and operate each of the solenoid valves independently.

As mentioned above, the solenoid valves 14 are mounted on the transmission valve body which is located inside the transmission case 30 of the vehicle. However, the controller is located outside the transmission case. Therefore, the harness 12 which connects these parts extends between the inside of the transmission case 30 and the outside thereof through an opening 55 in the transmission case 30.

Along a portion of the harness 12 where several of the lead wires follow a common path, such as the portion 56 outside the transmission case 30, the lead wires of the harness may be routed together inside a tubing, such as PVC tubing 58, or otherwise bound together. In the portion of the harness 12 inside the transmission case, the four lead wires diverge and are routed to the four solenoid valves. However, where two or more of the lead wires are routed along a common path inside the transmission case 30, they may be bound together or located inside a tubing, such as tubing 59.

Located at a position along the harness 12 where the harness extends through the opening 55 in the transmission case 30 is a transmission case plug 60. The transmission case plug 60 is designed to prevent the flow or seepage of fluid from inside the transmission case 30 through the opening 55 in the transmission case 30 through which the harness 12 extends. Accordingly, the transmission case plug 60 includes an appropriate seal, such as an O-ring seal, along its interface with the transmission case.

In the embodiment of FIG. 1, each of the lead wires of the harness is made up of two separate lengths of wire that are spliced together. The splice in each lead wire is located along the lead wire at the transmission case plug 60. In the length outside the transmission case, each of the lead wires is size 18 gauge wire and is covered with a plastic insulative coating such as Teflon. In the length of each lead wire inside the transmission case, each of the lead wires is size 22 gauge wire and has a high temperature resistant plastic insulative coating such as high temperature Teflon. A thicker gauge of wire is used for the harness lead wires outside the transmission case for higher strength and conductivity. A thinner gauge of wire is used for the harness lead wires inside the transmission case to minimize size and to facilitate bending and routing of the lead wires within the limited space of the transmission case.

To prevent seepage of fluid from the transmission case inside of the insulation of the lead wires jackets along the conductor portions, the insulation on each of the conductors of the lead wires is stripped back and the conductors are embedded in an insulative epoxy 61 at the location of the transmission case plug 60 where the separate lengths of each of the lead wires are spliced together. The epoxy 61 provides a bulkhead effect to retain fluid inside the transmission case and to prevent fluid from seeping out of the transmission case along the conductor portions of the lead wires.

The harness 12 also includes a ground wire portion 62. The ground wire portion 62 is located entirely inside the transmission case. The ground wire portion 62 includes four ground wires 64, 66, 68, and 70. One end of each of the ground wires is connected to each one of the solenoid valves 16, 18, 20, and 22. The other ends of each of the ground wires 64, 66, 68, and 70 are directly connected to the transmission valve body which in turn is connected to the vehicle ground. The grounded end of the ground wire portion 62 may include a ground terminal such as eyelet 72. The connection between the ground wire portion 62 of the harness 12 and the transmission valve body may be made by connecting the eyelet 72 to the transmission valve body with a bolt or similar fastener. Where several of the ground wires are proximate to each other, such as the ground wires 66, 68, and 70, they may be connected together to a single ground terminal 74 which in turn may be bolted to the transmission valve body.

In the embodiment of FIG. 1, the connection between the harness 12 and each of the solenoid valves is made by means of a plug and receptacle arrangement. The plug and receptacle arrangement provides a number of advantages compared to prior solenoid valve harnesses in which the solenoid valves are soldered or welded to the harness.

Figure 2:
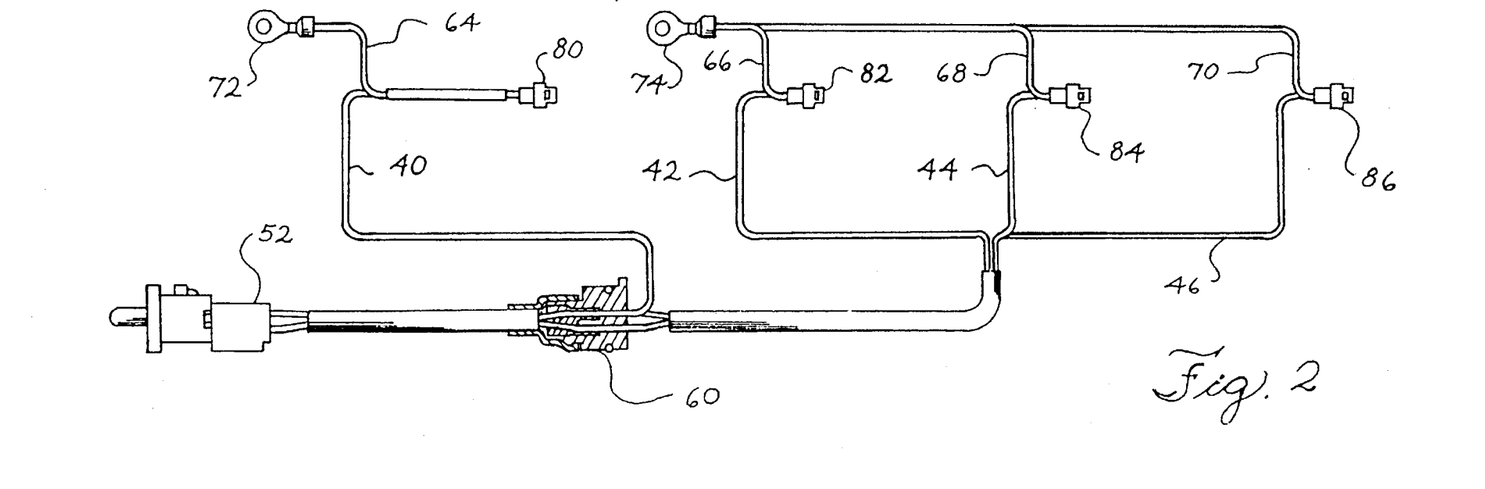
FIG. 2 shows the harness portion of the embodiment FIG. 1.

FIG. 2 shows a harness portion 12 of the solenoid harness assembly 10 without the solenoid valves. The harness portion 12 includes the lead wires 40, 42, 44, and 46, the ground wires 64, 66, 68, and 70, their respective plugs 80, 82, 84, and 86, the controller plug 52, the transmission case plug 60, and the grounding terminals 72 and 74. Because the harness 12 is provided as a separate component from the solenoid valves 16, 18, 20, and 22, each of these components can be tested prior to being connected together. In a preferred embodiment, the harness 12 can also be disconnected from any or all of the solenoid valves. Thus, in preferred embodiment it would be possible to replace a defective solenoid valve in the field without discarding the entire solenoid valve harness 10.

Figure 3:
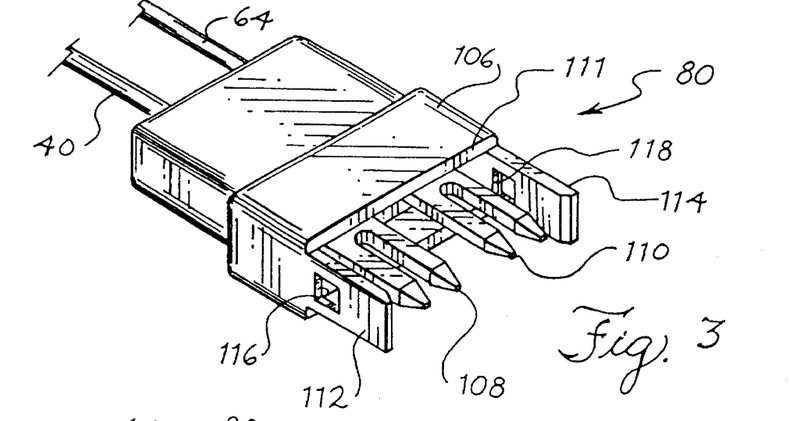
FIG. 3 is a perspective view of one of the harness plugs of the embodiment of FIG. 1.
Figure 4:
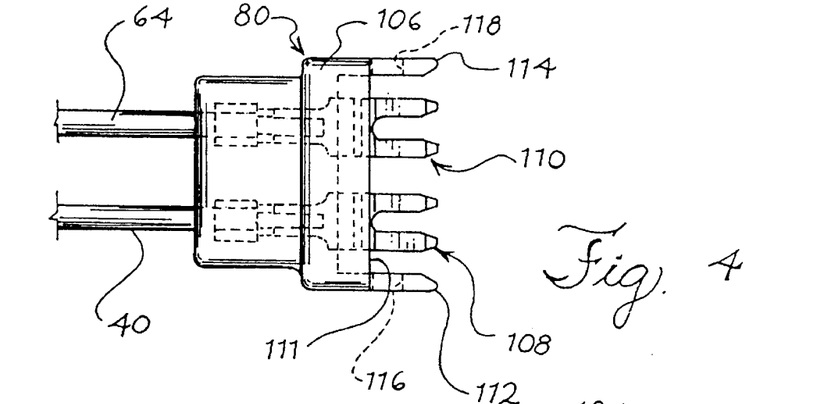
FIG. 4 is a top view of the harness plug shown in FIG. 3.

Referring to FIG. 3, there is shown one of the plugs 80 of the harness 12. The plugs 82, 84, and 86 may be identical to the plug 80 and are not separately shown. The plug 80 includes a plug housing portion 106 that holds two terminals 108 and 110 in a side-by-side relationship. The plug housing 106 is made of a plastic insulative material, such as nylon, and the terminals are made of a conductive material. Connected to the plug housing 106 are the lead wire 40 and the ground wire 64. The lead and ground wires enter into the inside of the plug housing 106 via an opening in the rear side of the plug housing 106. The end of the lead wire 40 connects to the terminal 108 and the end of the ground wire 64 connects to the terminal 110.

The two terminals 108 and 110 extend from a forward edge 111 of the plug body 106. The plug 80 also includes latching arm portions 112 and 114 that extend from the forward edge 111 of the plug housing body 106 in the same direction as the terminals 108 and 110. The latching arm portions 112 and 114 each have a small recess or opening, 116 and 118, respectively, located in or through the latching arm portions close to the forward edge 111 of the plug housing body 106. The recesses 116 and 118 serve to fix the plug 80 to its corresponding receptacle on the solenoid valve, as explained below.

Figure 5:
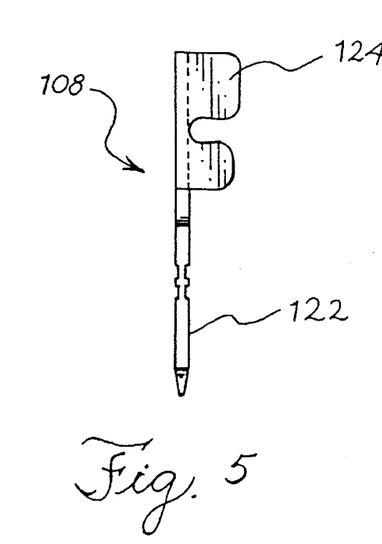
FIG. 5 is a side view of one of the harness plug terminals shown in FIG. 3.
Figure 6:
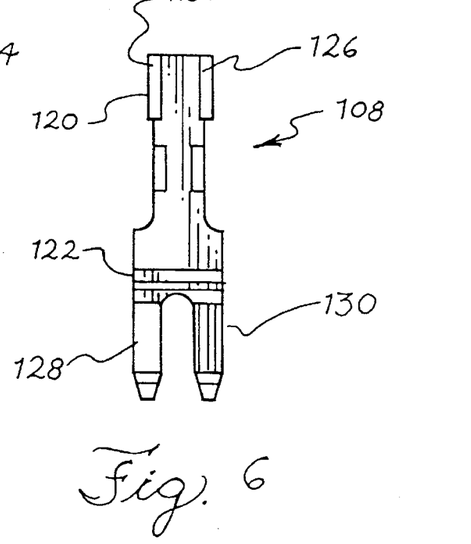
FIG. 6 is a top view of the harness plug terminal shown in FIG. 5.

FIGS. 5 and 6 show the lead terminal 108. The ground terminal 110 may be identical to the lead terminal 108. The lead terminal 108 includes a rear portion 120 and a front portion 122. The rear portion 120 has upward extending sides 124 and 126. The connection between the lead wire 40 and the lead terminal 108 may be made by stripping the insulation from the end of the lead wire 40, pressing the bare conductor end of the lead wire into the lead terminal 108, and bending the sides 124 and 126 of the lead terminal 108 to mechanically secure the bare end of the lead wire 40 into the lead terminal 108 and to make an electrical connection between the conductive portion of lead wire 40 and the lead terminal 108. The front portion 122 of the lead terminal 108 includes a pair of tines 128 and 130. The lead terminal 108 may be a commercially available product, such as the IDC (insulation displacement connection) terminal, part no. 62898-1, available from AMP, Incorporated.

Figure 7:
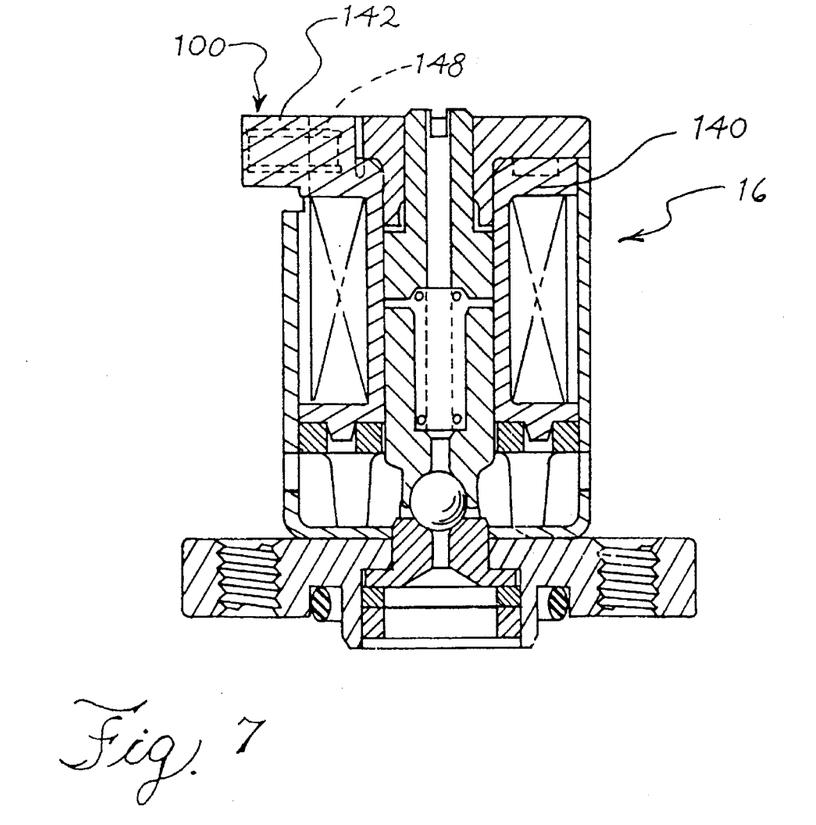
FIG. 7 is a vertical sectional view of one of the solenoid valves of the embodiment of FIG. 1.

As mentioned above and shown in FIG. 1, the plug 80 is designed to mate with a receptacle on the solenoid valve 16. Referring to FIG. 7, there is shown the solenoid valve 16. This solenoid valve 16 may be identical to the solenoid valve described in U.S. Pat. No. 5,322,260, except that this solenoid valve is modified to accommodate connection to the plug 80 of the harness. In order to accommodate connection to the plug on the harness, the solenoid valve 16 has a receptacle 100 that is matable with the plug 80 on the harness.

As described in the aforementioned U.S. patent, the solenoid valve includes a length of wire wound around a bobbin to form a coil. By passing a current through the wire, a field is generated inside the coil to move an armature located in the bobbin. The armature in turn is connected to the valve body. In order to pass a current through the wire that forms the coil, the coil wire must form a complete circuit. Typically, one end of the coil wire is connected via a lead wire of the harness to the controller and the other end of the coil wire is connected via a ground wire of the harness to the vehicle ground. In the solenoid valve 16 shown in FIGS. 7 and 8, there is shown a bobbin 140 wound with the wire coil.

Figure 8:
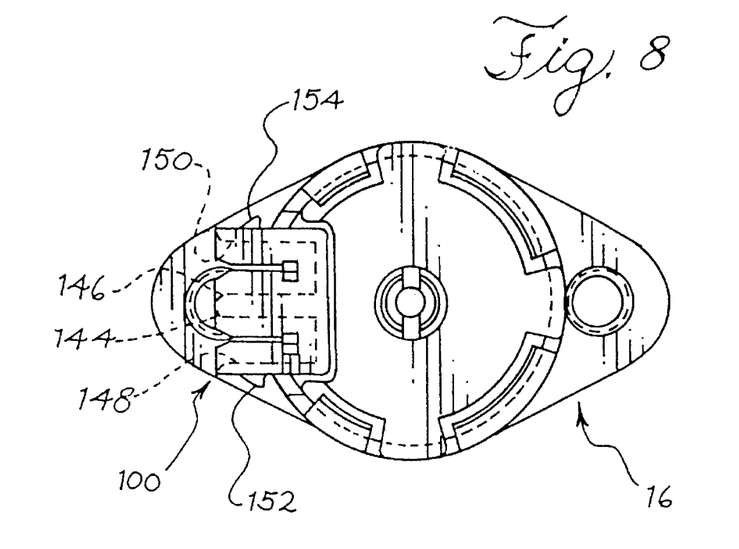
FIG. 8 is a top view of the solenoid valve of FIG. 7.
Figures 9, 10, 11:
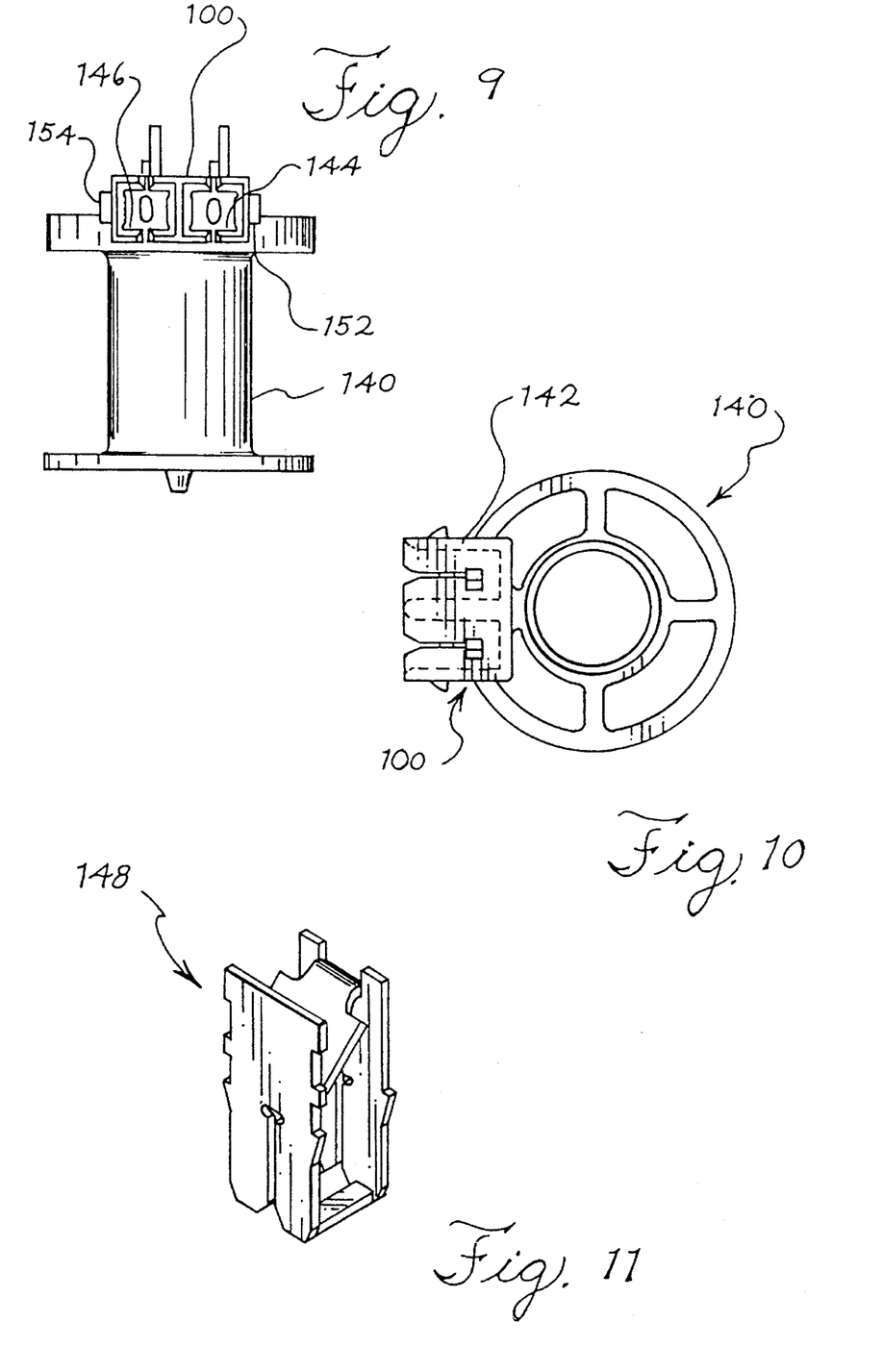
FIG. 9 is a side view of the bobbin shown in FIG. 7.
FIG. 10 is a top view of the bobbin shown in FIG. 9.
FIG. 11 is a perspective view of one of the terminals located inside the receptacle housing of the solenoid valve of FIG. 7.

In the embodiment of the solenoid valve shown in FIGS. 7 and 8, the receptacle 100 is connected to the bobbin 140 and located at a top end of the bobbin 140. Specifically, as shown in the FIGS. 9 and 10, the receptacle 100 is formed of the same piece of molded plastic material as the bobbin 140. In one preferred embodiment, the bobbin is made of nylon. The receptacle 100 includes a housing 142 having two ports 144 and 146. The port 144 houses a terminal 148 and the port 146 houses a terminal 150. The terminal 148 is shown in FIG. 11 and an identical terminal is used for the terminal 150. The ends of the coil wire connect to the receptacle terminals 148 and 150. Connection between the ends of the coil wire and the receptacle terminals 148 and 150 may be made by a mechanical connection or by soldering, welding, etc. The terminals 148 and 150 in the receptacle 100 are matable with the terminals 108 and 110 in the plug 80. In a preferred embodiment, these receptacle terminals 148 and 150 are the mating pairs, part no. 62526-1, of the IDC terminals 108 and 110.

Located along the outside of the receptacle housing 142 are projections 152 and 154. The projections 152 and 154 are ramped to form steep edges at the rear ends thereof. The projections 152 and 154 are sized and adapted to engage the recesses 116 and 118 of the plug 80. Thus, when the plug 80 is pushed into the receptacle 100, the latching arms 112 and 114 bend slightly allowing the projections 152 and 154 to slide into and engage the recesses 116 and 118. However, the edges at the rear ends of the projections 152 and 154 prevent withdrawal of the plug 80 from the receptacle 100 by pulling on the plug once they are engaged.

The plug and receptacle arrangement for connecting the harness to the solenoid valves provides a number of advantages. One of the advantages relates to ease of manufacture. With the plug and receptacle arrangement, the harness and solenoid valves can be literally snapped together thereby significantly facilitating manufacture and assembly of the solenoid valve harness. During the manufacturing stage, the harness and plugs are manufactured separately from the solenoid valves. The manufacture of the harness including the plugs can be largely automated. Connection of the terminals inside the plugs to the lead and ground wires may be performed either by mechanical-type connections or by soldering connections that can be readily automated. Likewise, the connection of the ends of the coil wire to the terminals of the receptacle may be made by mechanical connections or by soldering operations that can be automated. Then, once the harness and solenoid valves are separately manufactured, they can be plugged together and installed on the transmission valve body of the vehicle transmission. Therefore, relatively costly operations in which the harness is separately soldered to each of the solenoid valves can be avoided.

Another advantage provided by the embodiment of FIGS. 1–11 relates to quality control and yield. In prior solenoid valve harnesses in which the harness is directly soldered to the solenoid valves, it may be difficult or relatively expensive to test each of the solenoid valves and the harness prior to connection together. Also, in prior solenoid valve harnesses, the electrical connections may be damaged during the step of soldering the coil wires to the harness. Under such circumstance, the entire solenoid valve harness will have to be discarded. With the embodiment shown in FIGS. 1–11, the step of soldering the harness to the solenoid valves is replaced with the more reliable step of plugging the harness plugs into the receptacles on the solenoid valves. Moreover, in the embodiment of FIGS. 1–11, if a defect does turn up, the defective component, either one of the solenoid valves or the harness, can easily be removed and replaced. Removal of any of the solenoid valves from the harness may be accomplished by prying the latching arms away from the projections so that the plug can be removed from the receptacle.

A further advantage relates to quality control and testing during manufacture. With a readily accessible receptacle on each solenoid valve, testing of each solenoid valve prior to connection to the harness is facilitated. For example, a testing device may employ a plug identical to the those on the harness to easily energize the solenoid valve for testing. Similarly, the harness can be tested separately prior to connection to any of the solenoid valves by means of a testing device that has a connector identical to the receptacle on the solenoid valves. In this way, if the harness or any the solenoid valves are defective, they will not be used in the assembly.

A still further advantage relates to solenoid valve harness strength and durability. In a solenoid valve of the type used for this application, it is typical to provide a large number of turns in the coil. Because of this, a relatively thin wire is used for the coil wire inside the solenoid. Thus, the wire used for the coil is relatively fragile compared to the wires of the harness. Stresses and vibrations may be encountered by the solenoid valve harness during manufacture and operation. Because the wire used for the solenoid coil is relatively fragile, it is relatively susceptible to damage compared to the wires used in the harness. If the solenoid coil wire is damaged, the entire solenoid valve harness assembly will have to be discarded. Therefore, it would be advantageous to avoid stressing the wire of the coil and to transfer any stresses away from the coil wire toward larger, sturdier components.

The embodiment of the invention shown in FIGS. 1–11 provides for reducing the susceptibility of damage to the coil wire. In the solenoid valve harness 10, the plug portion of the harness connects directly to the bobbin of the solenoid valve by means of the receptacle located on the bobbin. Thus, the connection that is made is a mechanical connection between two relatively strong plastic components. Therefore, any physical stresses that are applied to the connection between the solenoid valves and the harness are transferred and carried by these relatively strong plastic pieces. The connections between the conductive components, such as the connection between the conductor of the lead wire and the plug terminal or the connection between the coil wire and the receptacle terminal, are physically isolated from such stresses.

Figure 12:
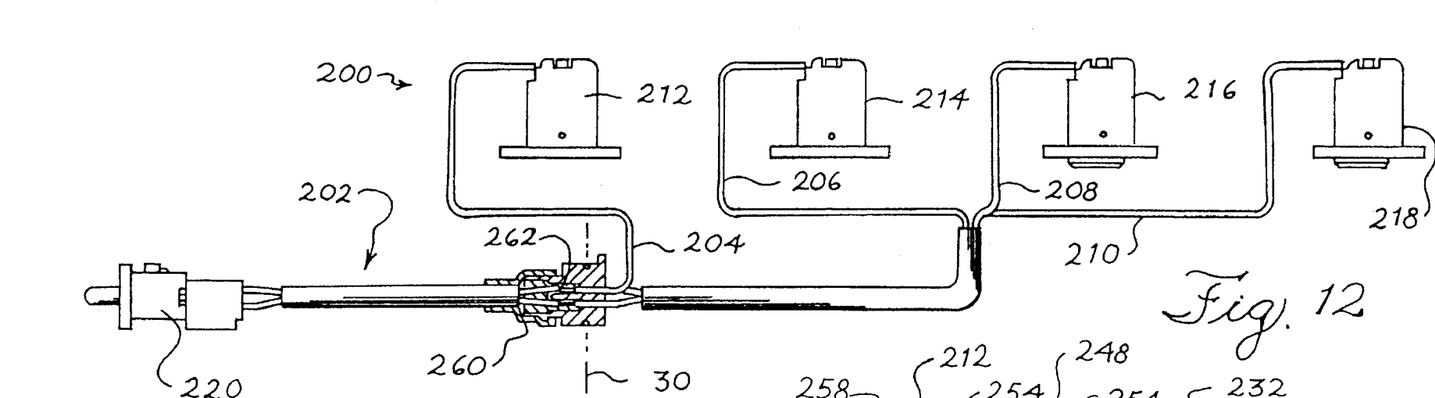
FIG. 12 is a side view of a solenoid valve harness assembly according to a second embodiment of the present invention.

FIGS. 12–22 show another embodiment of the present invention. Referring to FIG. 12, there is shown a solenoid valve harness 200. This solenoid valve harness 200 is similar to the solenoid valve harness 10 of FIGS. 1–11 except as noted below. As in the previously described embodiment, the solenoid valve harness 200 is used in a transmission of a vehicle.

Referring to FIG. 12, a solenoid valve harness 200 includes a harness portion 202. The harness 202 includes four lead wires 204, 206, 208 and 210 that connect four solenoid valves 212, 214, 216, and 218 to a controller plug 220. In the embodiment of FIGS. 12–22, the solenoid valves are internally grounded. Specifically, one end of the coil wire is connected directly internally to the solenoid valve housing which in turn is connected to the transmission valve body and the vehicle ground. Because the solenoid valves are internally grounded, the need to provide separate ground wires from each solenoid valve is eliminated. A number of advantages are provided by this embodiment, as explained below.

Figure 13:
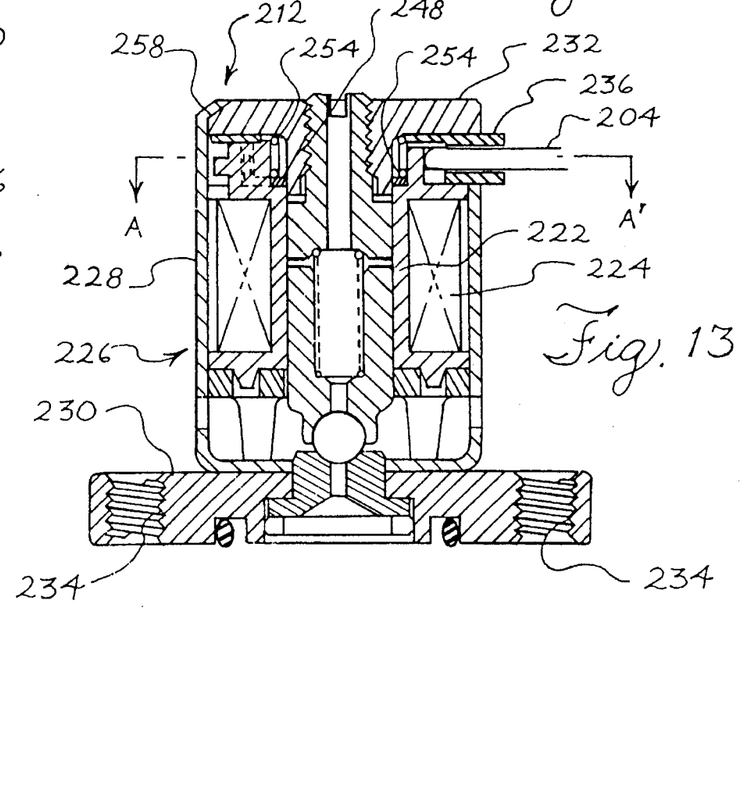
FIG. 13 is a vertical sectional view of one of the solenoid valves used with the embodiment of FIG. 12.
Figure 14:
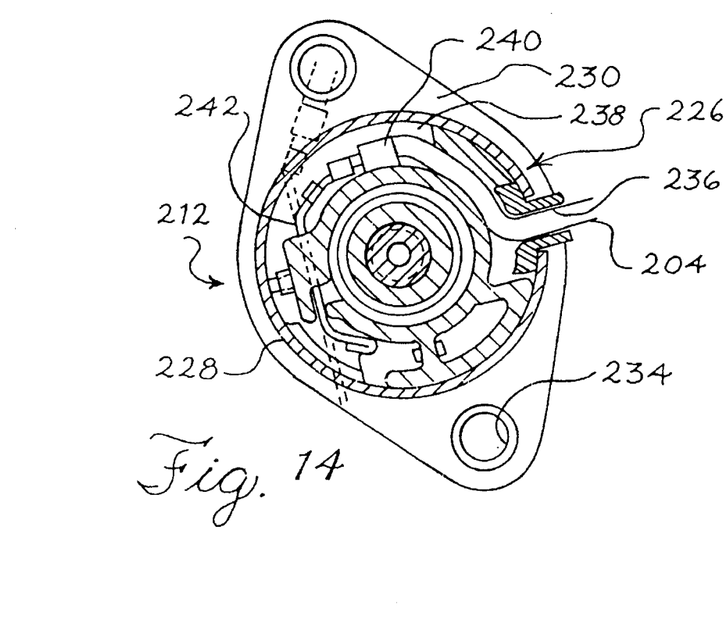
FIG. 14 is a sectional view of the solenoid valve of FIG. 13 taken along line A-A'.
Figures 15, 16, 17, 18:
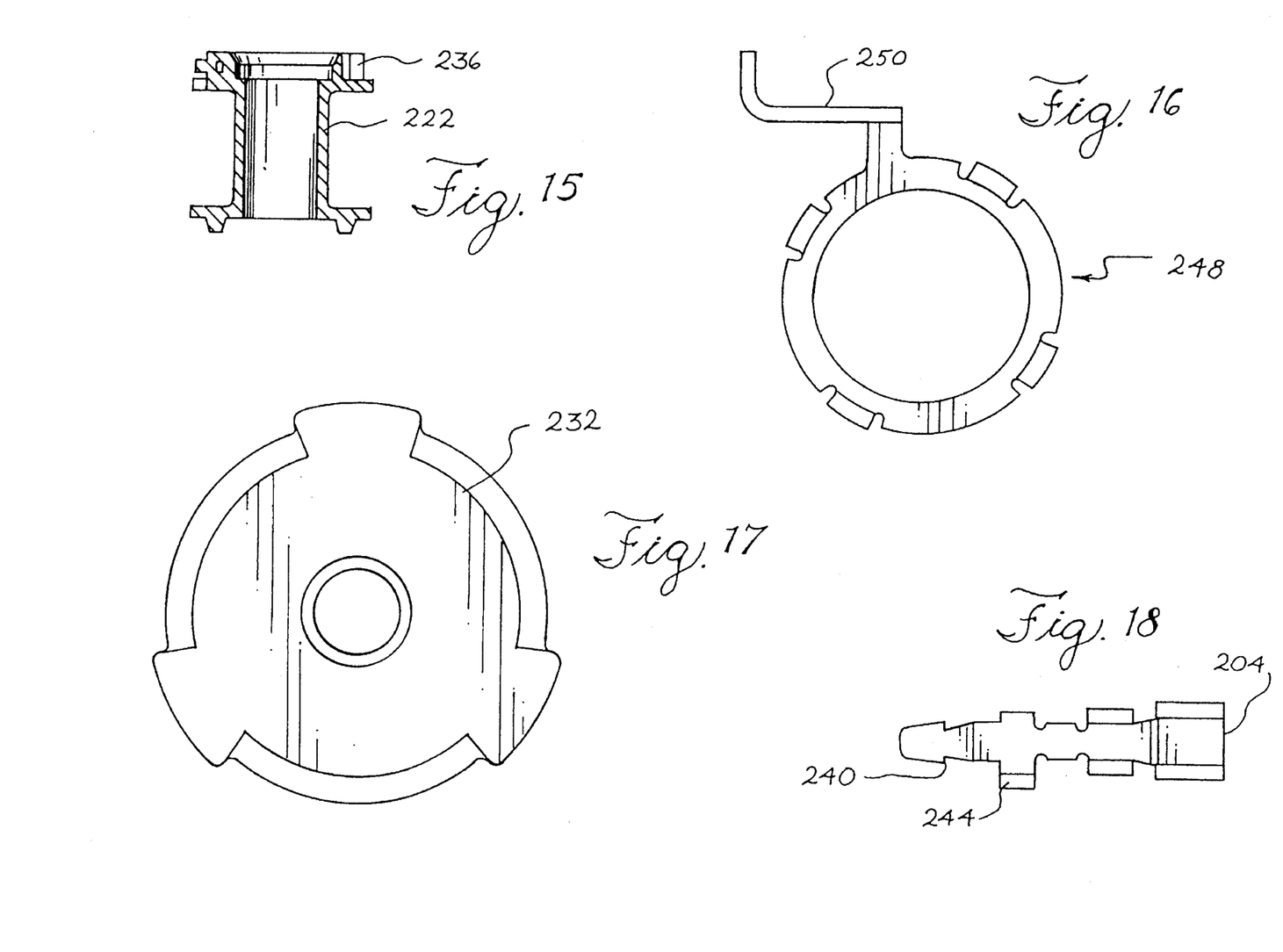
FIG. 15 is a side view of the bobbin shown in FIG. 13.
FIG. 16 is a top view of the ground terminal shown in FIG. 13.
FIG. 17 is a top view of the end cap shown in FIG. 13.
FIG. 18 is a top view of the lead terminal shown in FIG. 13.

FIGS. 13 and 14 show an embodiment of a solenoid valve 212 that is used in the solenoid valve harness 200 of FIG. 12. As in the previous embodiment, a wire is wound on a bobbin 222 to form a coil 224. The coil 224 is enclosed inside a solenoid valve housing 226. The solenoid valve housing 226 includes three parts: a cylindrically-shaped housing body 228, a housing cover 230, and an end cap 232 opposite the housing cover 230. In a present embodiment, the end cap is made of magnetic iron F-0000-45P having a density of 7 g/cc. The solenoid valve 212 is mounted onto the transmission valve body by bolting the housing cover 230 onto the transmission valve body. Apertures 234 in a flange portion of the housing cover 230 are provided for this purpose. The housing body 228 may be connected to the housing cover 230 by the welding process described in U.S. Pat. No. 5,322,260. The end cap 232 may be connected to the housing body 228 by the process described in the aforementioned patent. The end cap 232 is shown in FIG. 17. When the housing body 228, housing cover 230, and end cap 232 are assembled, a continuous electrical path is formed between the end cap 232 and the housing cover 230 through the housing body 228.

Referring to FIGS. 13, 14 and 15, the lead wire 204 enters into a port 236 of the solenoid valve 212. The port 236 is formed as part of the bobbin 222 and body 228. The lead wire 204 extends through a channel 238 formed in the top end of the bobbin 222. The insulation at the end of the lead wire 204 is stripped back and a lead terminal 240 is connected onto the conductive portion of the lead wire 204. The lead terminal 240 may be made of a suitable conductive material such as a tin plated half hard brass. The lead terminal 240 is shown in FIG. 18. Extending into the channel 238 from an opening located at the other end of the channel away from the port 236 is one end 242 of the coil wire. This end 242 of the coil wire is connected onto the lead terminal 240 of the lead wire. In a preferred embodiment, the end 242 of the coil wire is wound around a lead terminal post 244 of the lead terminal 240 and soldered or welded onto the lead terminal post 244. This melts away the insulation on the end 242 of the coil wire and provides for making an electrical connection between the coil wire and the lead terminal 240. In a preferred embodiment, winding of the end 242 of the coil wire onto the lead terminal post 244 and soldering these parts together is performed by automated processes as known in the art.

In order to complete the current path for the coil wire, the other end of the coil wire is connected to ground. Referring to FIGS. 13, 16, 17, and 20, the second end 246 of the coil wire is connected to a ring-shaped ground terminal 248. This ring-shaped ground terminal 248 is located inside the solenoid valve housing 226 close to the top end of the bobbin 222. The ground terminal 248 is made of a conductive material, such as tin coated half hard brass. Located on the ground terminal 248 is a ground terminal post 250. The ground terminal post 250 extends into a notch 252 at the top of the bobbin 222. The second end 246 of the coil wire is wound onto the ground wire post 250 and soldered to it to remove the insulation on the end of the coil wire and to make a secure electrical connection between the ground terminal 248 and the second end 246 of the coil wire.

Located between the ring-shaped ground terminal 248 and the end cap 232 is a small spring 254. The spring 254 has a diameter corresponding to the size of the ring-shaped ground terminal 248. When the solenoid valve 212 is assembled, the spring 254 is in compression and bears against both the ring-shaped ground terminal 248 and the end cap 232. The spring 254 is made of an electrically conductive material, such as music wire or stainless steel wire. An electrical conduction path is established between the second end 246 of the coil wire, the ring-shaped ground terminal 248, the spring 254, the end cap 232, the housing body 228, and the housing cover 230 to ground.

Figures 19, 20:
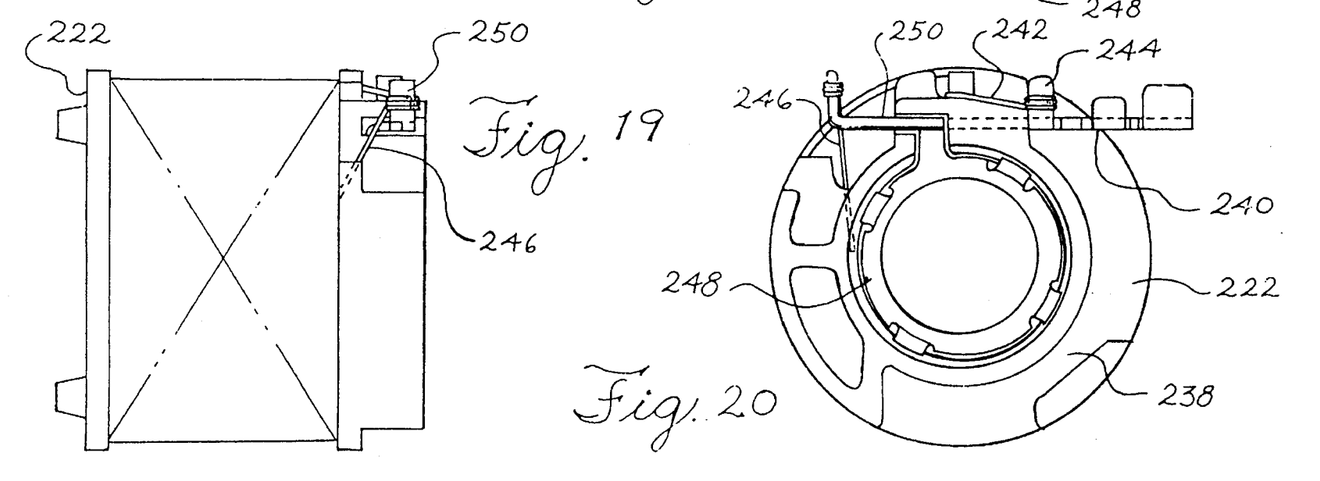
FIG. 19 is a side view of the solenoid coil of FIG. 13 shown partially assembled without the exterior housing in one stage of manufacture.
FIG. 20 is an end view of the assembly of FIG. 19.
Figures 21, 22:
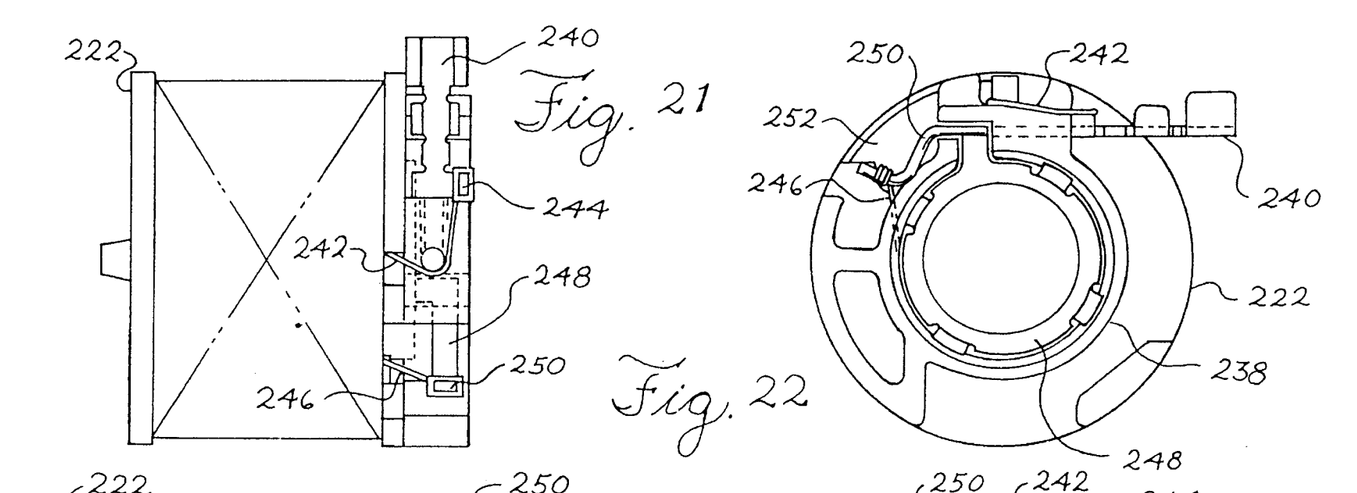
FIG. 21 is a side view of the assembly of FIG. 19 shown in a later stage of manufacture.
FIG. 22 is an end view of the assembly of FIG. 21.

In order to facilitate automation of the manufacture of the solenoid valve, the lead terminal post 244 on the lead terminal 240 and the ground terminal post 250 on the ring-shaped ground terminal 248 can be formed to have an initial shape as shown in FIGS. 20 and 21. With the coil wound on the bobbin 222, the ring-shaped ground terminal 248 located in the top of the bobbin 222, and the lead wire terminal 240 connected to the end of the lead wire 204, the first end of the coil wire 242 is wound onto the lead terminal post 244 of the lead wire terminal 240 and the second end 246 of the coil wire is wound onto the ground terminal post 250 of the ring-shaped ground terminal 248. The ends 242 and 246 of the coil wire are then soldered onto the posts 244 and 250, respectively. Then, the lead terminal post 244 of lead wire terminal 240 is bent downward and the ground terminal post 250 of the ground wire terminal 248 is bent downward, as shown in FIGS. 21 and 22. The lead wire 204 and lead wire terminal 240 are pressed into the channel 238 on the top of the bobbin 22. Then, the spring 254 and end cap 232 are positioned onto the bobbin 222 and the tabs 258 of the housing body 238 are bent over the end cap 232 thereby securing the end cap 232 onto the housing body 228. This also results in completing the electrical ground connection between the second end 246 of the coil wire and the cover 230 of the solenoid valve.

The embodiment of the solenoid valve harness shown in FIGS. 12–22 provides a number of advantages. First of all, because the solenoid valves are internally grounded, the expense of the separate ground wire portion of the harness is eliminated.

A further advantage that follows from the elimination of the ground wires is that there is more room for the lead wires 204, 206, 208, and 210. Because there is more room for the lead wires, the need to use a smaller gauge wire for the lead wires inside the transmission case may also be avoided. This permits the same gauge wire to be used for the lead wires both inside and outside the transmission case thereby avoiding the need to splice together difference sizes of wires, as in prior solenoid valve harnesses.

In the embodiment of the solenoid valve harness shown in FIG. 12, the same size wire, e.g. 18 gauge, is used for the lead wires both inside and outside the transmission case. In a preferred embodiment, each lead wire 204, 206, 208, and 210 is formed of a continuous piece of wire without any splices. In the location of the transmission case plug 260, a portion of the insulation is removed from each of the lead wires so that the lead wire conductors can be embedded in an epoxy 262 to prevent seepage from the transmission case. In the embodiment of FIG. 12, each of the lead wires 204, 206, 208, and 210 has a high temperature insulative jacket suitable for use inside the transmission case. Since single, continuous lengths of wire are used in this embodiment instead of separate lengths of wire spliced together, a high temperature resistant, insulative nonconductive jacket is provided on the lead wires both inside and outside the transmission case.

The embodiment of the solenoid valve harness in FIGS. 12–22 may be formed with a plug and receptacle arrangement as in the embodiment shown in FIGS. 1–11. If a plug and receptacle arrangement is used for the embodiment of FIGS. 12–22, the plugs and receptacles need to provide for connection of the lead wires only since the solenoid valves are internally grounded. In a present embodiment, the solenoid valve harness of FIGS. 12–22 are formed without a plug and receptacle arrangement.

It is intended that the foregoing detailed description be regarded as illustrative rather than limiting and that it is understood that the following claims including all equivalents are intended to define the scope of the invention.

We claim:

1. A solenoid valve for use with a harness in a vehicle transmission, said solenoid valve comprising:

an exterior housing; and a solenoid coil located inside said housing, said solenoid coil including at least one coil wire;

wherein one end of said coil wire is grounded to said exterior housing.

2. The solenoid valve of claim 1 wherein said one end of said coil wire is grounded to a portion of said exterior housing.

3. The solenoid valve of claim 1 wherein said one end of said coil wire is grounded to an end cap of said solenoid valve.

4. The solenoid valve of claim 1 further comprising a ground terminal located inside said exterior housing, said one end of said coil wire connected to said ground terminal.

5. The solenoid valve of claim 4 in which said ground terminal provides an electrical path between said one end of said coil wire and said exterior housing.

6. The solenoid valve of claim 4 further comprising a spring located between said ground terminal and said exterior housing and further wherein said spring provides an electrical path between said ground terminal and said exterior housing.

7. The solenoid valve of claim 4 in which said ground terminal includes a ground terminal post and further in which said one end of said coil wire is connected to said ground wire post.

8. The solenoid valve of claim 4 further comprising a lead wire terminal located in the end cap and comprised of a conductive material and further in which a second end of said coil wire is connected to said lead wire terminal.

9. The solenoid valve of claim 8 further comprising a lead terminal post located on said lead wire terminal and further in which said second end of said coil wire is connected to said lead terminal post.

10. The solenoid valve of claim 8 in which said lead terminal is located in a channel located in a bobbin upon which said coil wire is wound.

11. A solenoid valve for use in a transmission of a vehicle, said solenoid valve mounted internally of the transmission, said transmission including an electrical ground, said solenoid valve including a magnet coil located inside a solenoid valve housing, and said solenoid coil including a lead wire end and a ground wire end, wherein said improvement comprises:

said ground wire end electrically connected to a portion of said solenoid valve housing such that when said solenoid valve is mounted in said transmission said ground end is electrically connected to said transmission ground through said solenoid valve housing.

* * * * *